United States Patent
Ahmad et al.

(10) Patent No.: US 6,359,857 B1
(45) Date of Patent: Mar. 19, 2002

(54) PROTECTION SWITCHING TRIGGER GENERATION

(75) Inventors: Khalid Ahmad, Nepean; Yucheng Ye, Ottawa; David W. Martin, Nepean, all of (CA)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 09/138,019

(22) Filed: Aug. 21, 1998

(30) Foreign Application Priority Data

Aug. 22, 1997 (WO) ............................ PCT/CA97/00596

(51) Int. Cl.$^7$ ...................... G06F 11/00; G06F 15/173
(52) U.S. Cl. ..................... 370/217; 370/227; 370/397; 709/239
(58) Field of Search ................... 370/216, 217, 370/218, 219, 220, 225, 227, 228, 239, 238, 244, 397; 709/238, 239, 241; 714/1, 2, 3, 4

(56) References Cited

U.S. PATENT DOCUMENTS

| | | | | |
|---|---|---|---|---|
| 4,837,760 A | * | 6/1989 | Reid et al. | 340/825.01 |
| 5,003,531 A | * | 3/1991 | Farinholt et al. | 370/224 |
| 5,212,475 A | | 5/1993 | Thoma | 340/825.16 |
| 5,218,601 A | * | 6/1993 | Chujo et al. | 370/228 |
| 5,321,688 A | | 6/1994 | Nakano et al. | 370/14 |
| 5,343,462 A | | 8/1994 | Sekihata et al. | 370/13 |
| 5,461,607 A | * | 10/1995 | Miyagi et al. | 370/244 |
| 6,011,780 A | * | 1/2000 | Vaman et al. | 370/237 |

FOREIGN PATENT DOCUMENTS

WO     WO 95 28047 A     10/1995

OTHER PUBLICATIONS

"A Fast ATM Rerouting Algorithm for Networks With Unreliable Links", Jones, C.K., et al, IEEE, vol. 1, No. 1, May 1–5, 1994, pp. 91–95 (XP000438889).

"Virtual Path Restoration Techniques Based on Centralized Control Functions", Hadama, H., et al, Electronics & Communications in Japan, Part I, Communications, vol. 78, No. 3, Mar. 1, 1995, pp. 13–26 (XP000527391).

"Performance and Fault Management Functions for the Maintenance of Sonet/SDH and ATM Transport Networks", IEE, ICC Geneva, May 23–26, 1993, vol. 3, No., May 23, 1993, pp. 1308–1314.

"ATM Network Survivability Architectures and Mechanisms" (Draft document) [Text extracted from COM 13–R–7 (Mar. 1997) ANNEX 5 (to the report of WP 3/13), pp. 1/22], ITU—Telecommunication Standardization Sector—Torino, Italy, Jun. 16–20, 1997.

(List continued on next page.)

*Primary Examiner*—Alpus H. Hsu
*Assistant Examiner*—Afsar M. Qureshi
(74) *Attorney, Agent, or Firm*—Angela C. de Wilton; Dennis R. Haszko

(57) ABSTRACT

A packet based telecommunication system, such as ATM, comprises a main data path and at least one bypass path, for bypassing a portion of the data path, the portion and the respective bypass defining a protection domain, the system comprising nodes for each of the domains, for monitoring respective domains and for issueing alarms in the form of packets, to other nodes downstream, with a domain identifier indicating the respective domain in which the alarm originated. At a given one of the nodes an alarm issued from a node upstream of the given node and a corresponding identifier, are detected. At the given node it is determined whether to trigger a rerouting of the data along one of the bypass paths which bypasses the domain monitored by the given node, on the basis of the detected domain identifier. Using the identifier, downstream nodes can determine more easily whether the alarm is caused by a domain which has a bypass path triggered by another node upstream. Thus the problem of unnecessary triggering, can be overcome without the considerable additional complexity, cost, and speed penalty of having nodes which must extract the alarm, modify it and send it on.

19 Claims, 7 Drawing Sheets

SINK NODE TRIGGERING OPERATION

OTHER PUBLICATIONS

"Discourse on Nested Protection", Contribution D.47, ITU (see above).

"Protected Domain Boundary Delineation", Contribution D.48, ITU (see above).

"Segment AIS Facilities", Contribution D.49, ITU (see above).

"Defect type Indication Field Coding", Contribution D.50 (see above).

* cited by examiner

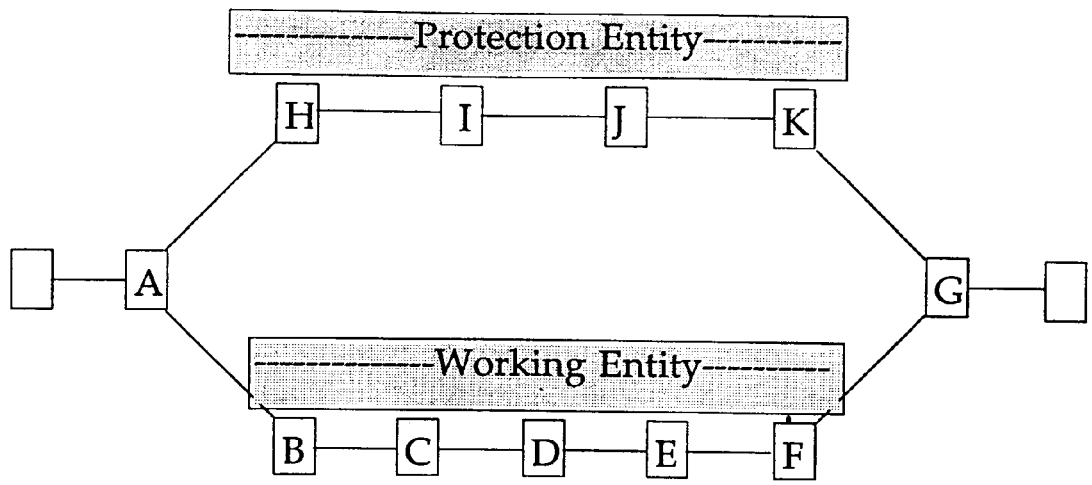
FIG.1. Simple Protection Switch
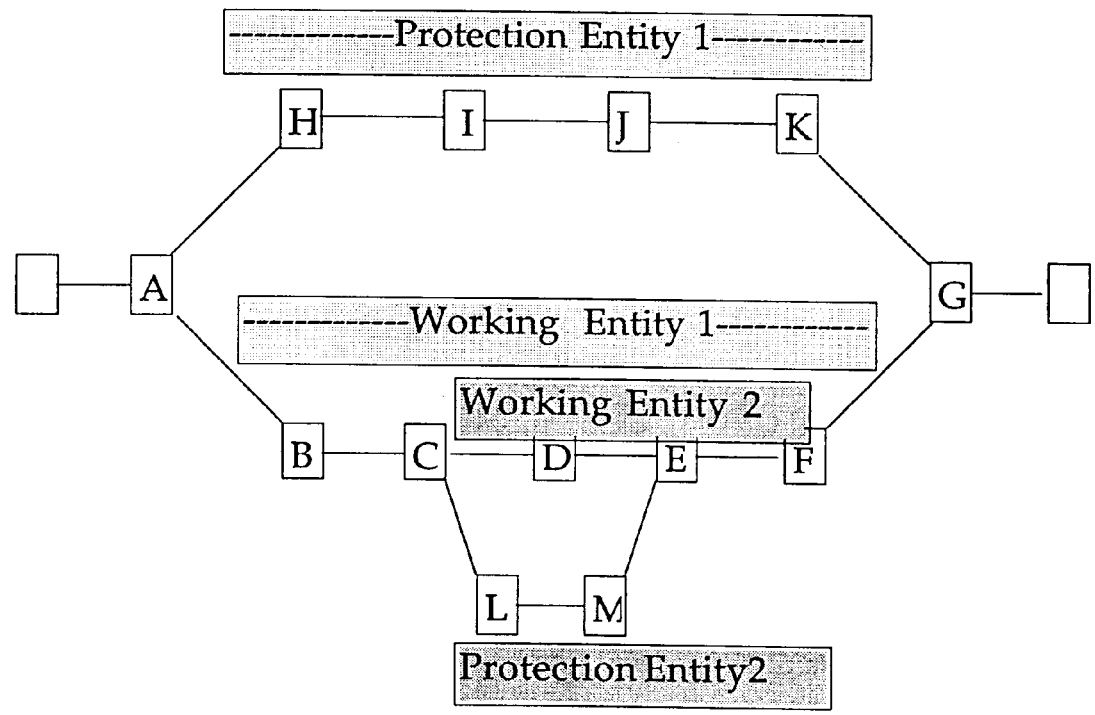
FIG.2. Nested Protection Switch

FIGURE 4 OVERVIEW OF NODE FUNCTIONS

FIGURE 5 SINK NODE TRIGGERING OPERATION

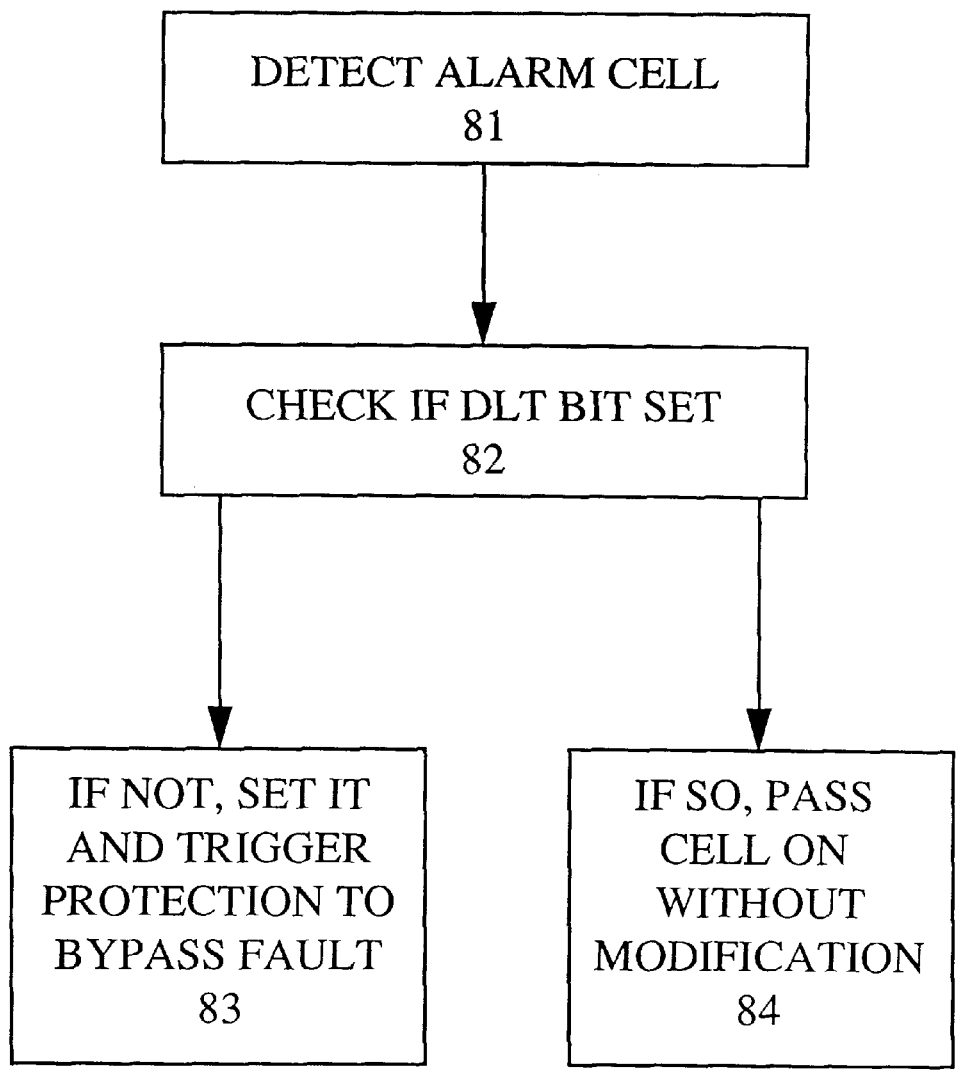
FIGURE 8 PRIOR ART TRIGGER GENERATION

PROTECTION SWITCHING TRIGGER GENERATION

FIELD OF THE INVENTION

The present invention relates to methods of triggering a rerouting of data in a packet based telecommunication system, to methods of bypassing faults in such systems, to such systems, nodes for such systems, and to software for such methods and for such nodes or systems.

BACKGROUND TO THE INVENTION

As explained in COM 13-R 7 ( March 1997) ANNEX 5 (to the report of WP 3/13, of ITU, "ATM Network Survivability Architectures and Mechanisms" network survivability can be divided into two broad categories, protection and restoration. Restoration includes reconfiguration, centrally controlled, and self healing, having distributed control, but not using completely dedicated bypass resources. The present invention is concerned with protection, which, for speed of operation has a distributed control architecture, and dedicated bypass paths.

Protection switching is concerned with minimising disruption to data traffic, at the expense of costly provision of dedicated paths with free bandwidth to enable data traffic to be switched instantly to the free path when necessary. One constraint which becomes more important, as bandwidth and data transmission reliability requirements increase, is the delay in detecting a need to switch, to trigger the protection, e.g. when a fault occurs.

Also, protection switching can occur at different layers in the network hierarchy. Coordination between layers may be necessary. Also, as connections are made over longer distances, delays in passing a trigger from a monitor at the destination, to the source, where the protection switching takes place, have meant that segmented protection switching has been used, for increased speed and efficient use of resources, particularly at lower layers of the network hierarchy.

Where multiple segments are monitored, it may be necessary for an alarm indication signal (AIS) to be sent to warn downstream monitors that a fault has been identified already, so the downstream monitors need not raise their own alarms as the consequences of the first fault propagate downstream.

Although the description hereinbelow will make use of ATM networks to show the, principles of the invention, they are clearly of broader applicability, e.g. to frame relay, or with appropriate modifications, to connectionless, networks, such as I.P.

Insertion of an AIS cell at the ATM layer, when a fault is detected, is shown in U.S. Pat. No. 5,461,607 (Miyagi et al). How a fault indication propagates up through network hierarchy layers from physical and transport layers up through the ATM layer to a data terminating equipment, is shown in U.S. Pat. No. 5,343,462 (Sekihata et al). Dealing with the alarm inpacket form rather than as lower level data, and doing the bypassing at the packet level makes it possible to arrange bypass paths at a more granular level on a connection basis, rather than having to bypass all the data on a link. This means the provisioning of these paths is more efficient and flexible, e.g. high priority connections can be separated, and allocated dedicated empty bypass paths, while lower priority connections or less sensitive connections might have to wait until other traffic is cleared from their bypass paths. Alarms causing the triggering of bypassing should be maintained at the packet level to avoid breaching the principle of passing alarms up the hierarchy, but never downwards where more data is multiplexed.

The problem of unnecessary protection switching occurring along an ATM VP in which multiple protected segments are provided, is described in contribution D47 of Q6/13, ITU meeting Turino, Italy, Jun. 16–20 1997. Examples in which an AIS cell is detected at more than one sink are shown. The sink is unable to determine from the AIS whether the fault is within its protection segment, or before it. If there is any dialogue of messages to determine the answer, or if a hold off is implemented, to wait and verify that the fault has not been bypassed already by a protection path in a preceding segment, before triggering protection, the delay would violate the requirement for fast protection switching.

One solution to the problem is shown in contribution D49 of Q6/13, ITU meeting Jun. 16–20 1997, Turino. On failure, an AIS cell is inserted and sent to the end of the connection. A bit in the cell is charged at the end of the segment in which failure occurred. The sink of the domain containing the failure triggers protection switching to bypass the failure. Other sinks further along the connection pass on the AIS cell, but know not to trigger their protection switching if they detect the charged bit in the AIS cell.

In contribution D48 to the above referenced ITU meeting nested protection schemes are catered for. The cell keeps a record of nesting level by recording how may sources or sinks it passes through, to enable the correct sink to trigger its protection as desired, whether that be the sink for the innermost of the nested protection schemes, or any other which covers the failed part.

It is known from contribution D50 of Q6/13 ITU meeting June 16–20 Turino, Italy to modify bits within the defect type indicator byte of the information field of the e-t-e AIS cells, to achieve recordal of status of the nesting level.

One problem with all these known arrangements is the requirement that each segment has the capability to extract, modify and reinsert the AIS cell. This results in greater complexity and cost, and may delay the throughput of data traffic, particularly if the sequence of the traffic is not disturbed.

In U.S. Pat. No. 5,212,475, a synchronous digital network is shown in which an alarm inhibit signal is generated at the physical layer when a fault is identified. The location of a fault is reported back to a central network management system. The inhibit signal is sent downstream to inhibit alarm generators downstream. This signal is modified by the insertion of a fault address message. Downstream signal distributors recognise the address and use it to determine whether to send a fault report message back to the central network management. system. They do not do so if the address is in the segment preceding a previous distributor. This means the alarm inhibit signal does not inhibit genuine alarms from other faults downstream. The central network management system triggers protection switching according to the messages it receives. However such an arrangement will not provide protection switching which is fast enough for many applications. Also, the requirement that every segment be able to extract and modify the inhibit signal, leads to increased complexity, particularly for high speed systems. The document does not refer to protection at a packet level.

SUMMARY OF THE INVENTION

It is an object of the present invention to provide improved methods and apparatus.

According to one aspect of the present invention there is provided a method of triggering a rerouting of data in a packet based telecommunication system, the system comprising a main data path and at least one bypass path, for bypassing a portion of the data path, the portion and the respective bypass defining a protection domain, the system comprising nodes for each of the domains, for monitoring respective domains and for issuing alarms in the form of packets, to other nodes downstream, with a domain identifier indicating the respective domain in which the alarm originated, the method comprising the steps of:

detecting at a given one of the nodes an alarm issued from a node upstream of the given node and a corresponding identifier;

determining at the given node whether to trigger a rerouting of the data along one of the bypass paths which bypasses the domain monitored by the given node, on the basis of the detected domain identifier.

An advantage of using the identifier is that downstream nodes can determine more easily whether the alarm is caused by a domain which has a bypass path triggered by another node upstream. Thus the problem of unnecessary triggering, described above, can be overcome without the considerable additional complexity, cost, and speed penalty of having nodes which can extract the alarm, modify it and send it on. Also, it provides a uniform solution for simple or nested protection switching. Another advantage is that the more precise location information can be used for other purposes.

Advantageously the alarm is issued to downstream nodes by inserting it into the data being transmitted. This can reduce costs by removing the need for a separate network, and increase speed of transmission to other nodes.

Advantageously, the system is connection oriented, and the rerouting is carried out without making a new connection. This enables the rerouting to be carried out with less disruption to the data, since there are considerable delays caused by the signaling involved in setting up a new connection.

Advantageously, the system comprises nested domains, and the method comprises the steps of determining that in an inner of the nested domains, the main path and the bypass path are faulty, and determining that the bypass for an outer one of the domains should be triggered. This is easier if the identifier is used, since otherwise, with the prior art modified bit scheme, the sink node for the outer domain may be unable to distinguish alarms from the two paths in the inner domain. Thus it may have insufficient information to make the triggering decision.

Preferably, the given node comprises a stored database indicating a priority where a domain can be bypassed by more than one bypass path, and the step of determining whether to trigger is made additionally on the basis of the stored priority. This enables nested or overlapping bypass paths to be handled more efficiently, and autonomously. Speed of triggering can be maintained. Conceivably, the identifiers could be coded so that an algorithm could be performed on the identifier to determine whether to trigger, without reference to a stored database.

Advantageously, the given node is a sink node, at the end of the bypass path triggerable by the given node to bypass the domain monitored by the given node.

According to another aspect of the present invention there is provided a method of bypassing faults in a packet based telecommunication system, the system comprising a main data path and at least one bypass path, for bypassing a portion of the data path, the portion and the respective bypass defining a protection domain, the system comprising nodes for each of the domains, for monitoring respective domains and for issuing alarms in the form of packets, to other nodes downstream, with a domain identifier indicating the respective domain in which the alarm originated, the method comprising the steps of:

detecting at a given one of the nodes an alarm issued from a node upstream of the given node and a corresponding identifier;

determining at the given node whether to trigger a rerouting of the data along one of the bypass paths which bypasses the domain monitored by the given node, on the basis of the detected domain; and rerouting the data along the given bypass path according to the trigger.

According to another aspect of the present invention there is provided software on a computer readable medium for carrying out a method of triggering a rerouting of data in a packet based telecommunication system, the system comprising a main data path and at least one bypass path, for bypassing a portion of the data path, the portion and the respective bypass defining a protection domain, the system comprising nodes for each of the domains, for monitoring respective domains and for issuing alarms in the form of packets, to other nodes downstream, with a domain identifier indicating the respective domain in which the alarm originated, the method comprising the steps of:

detecting at a given one of the nodes an alarm issued from a node upstream of the given node and a corresponding identifier;

determining at the given node whether to trigger a rerouting of the data along one of the bypass paths which bypasses the domain monitored by the given node, on the basis of the detected domain identifier.

According to another aspect of the present invention there is provided a node for a packet based telecommunication system, the system comprising a main data path and at least one bypass path, for bypassing a portion of the data path, the portion and the respective bypass defining a protection domain, the system comprising nodes for each of the domains, for monitoring respective domains and for issuing alarms in the form of packets, to other nodes downstream, with a domain identifier indicating the respective domain in which the alarm originated, the node comprising:

means for detecting at a given one of the nodes an alarm issued from a node upstream of the given node and a corresponding identifier;

means for determining at the given node whether to trigger a rerouting of the data along one of the bypass paths which bypasses the domain monitored by the given node, on the basis of the detected domain identifier.

According to another aspect of the present invention there is provided a packet based telecommunication system, the system comprising a main data path and at least one bypass path, for bypassing a portion of the data path, the portion and the respective bypass defining a protection domain, the system comprising nodes for each of the domains, for monitoring respective domains and for issuing alarms in the form of packets, to other nodes downstream, with adomain identifier indicating the respective domain in which the alarm originated, the node comprising:

means for detecting at a given one of the nodes an alarm issued from a node upstream of the given node and a corresponding identifier;

means for determining at the given node whether to trigger a rerouting of the data along one of the bypass paths which bypasses the domain monitored by the given node, on the basis of the detected domain identifier.

Preferred features may be combined as would be apparent to a skilled person, and may be combined with any aspect of the invention.

To show, by way of example, how to put the invention into practice, embodiments will now be described in more detail, with reference to the accompanying drawings.

BRIEF DESCRIPTION OF THE DRAWINGS

FIGS. 1 and 2 show in schematic form data transmission systems

FIG. 8 shows in schematic form a prior art trigger generation scheme.

DETAILED DESCRIPTION

Figure 3:
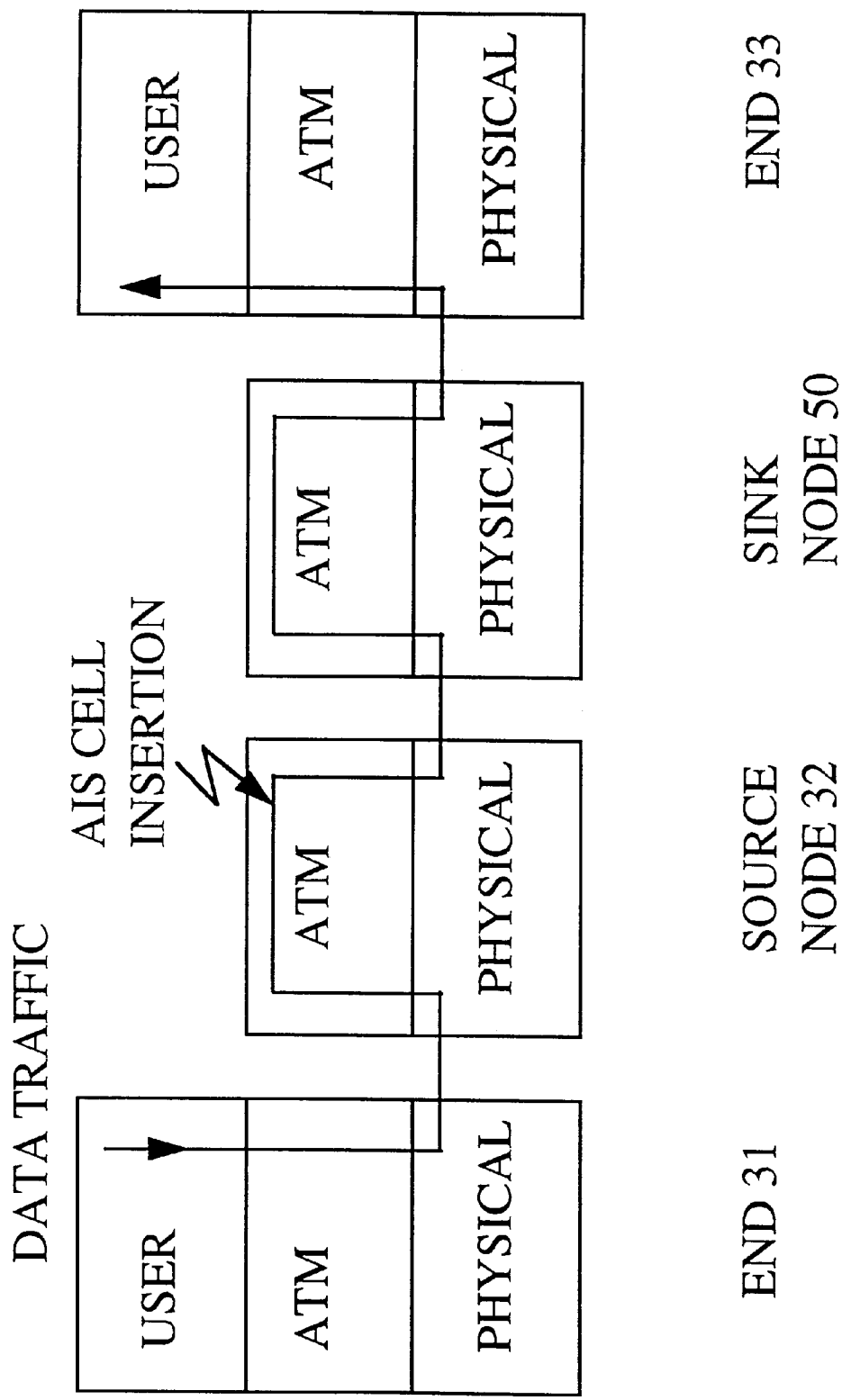
FIG. 3 show layers of the network hierarchy for an ATM network.

FIGS. 1 and 2 show networks to which the present invention can be applied. In these embodiments, the alarm is issued in the form of a conventional AIS cell. The Defect Location field is used as the identifier to identify one or more segments grouped as protection domains to enable use of the existing AIS mechanism described in ITU-T Recommendation I610, to initiate protection switching. Reference is made to this document for a detailed description of the format of the AIS cell, how it is used, and how various OAM (operations and management) cells are used for fault management, performance management, and system management.

One issue under discussion in ATM Protection Switching is the identification of the protection domain in the triggering mechanism. It is noted that AIS cell has a Defect Location Identifier field already defined (currently its use is optional in I.610).

In an embodiment which makes use of the Defect Location field in a normal AIS cell to identify the protection domain, when a AIS cell is generated, upon detection of a fault, the corresponding location ID should be filled in the cell as defined in I.610. The sink nodes, at the end of each protection domain will check the location field of the incoming AIS cell to determine whether the AIS was generated within the domain by comparing the location ID with the provisioned values.

This triggering mechanism follows the I.610 definition and will not modify any information provided by the AIS cell. The location message even can be used to explicitly indicate the fault location for repairing services.

This triggering mechanism needs each sink node to know its protection domain, including the ID of the node and protection hierarchy (for nested protection). This information is in any case available to the network management system when the protection domain is set up.

Unlike prior art mechanisms, using the Defect Location Field (DLF) of the AIS cells for Protection Switch trigger application can work in all the protection scenarios in the same way.

An overall view of the steps involved now follows:

Step 1. When Telecommunications Management Network (TMN) configures or reconfigures protection domains, it uses PDE format to define the protection domain and protection hierarchy in the local databases at each node.

Step 2. When the AIS cell is generated, the Location ID where the outage occurred is filled into the Defect Location field (DLF) of the AIS as defined in I.610.

Step 3. When the AIS cell arrives at a sink node, it will be passed to the next downstream node without any change, and its DLF will also be checked whether the value is located in the domain of this sink node, and if yes, which level.

Step 4. If the DLF check concludes yes, the node will trigger the corresponding protection switching without reference to the TMN, on account of the delay which would otherwise be incurred.

Step 5. After switching, the TMN is alerted, and it modifies the Status field of PDE for each node that is changed.

FIG. 1, Simple Protection Switch Scenario

The non-nested protection switch configuration shown in FIG. 1 is called a Simple Protection Switch. Nodes A to K are shown, defining segments between the nodes.

A, B, C, D, E, F, G comprises working entity;

A, H, I, J, K, G comprises protection entity;

A is the source point of both working and protection domain; and

G is the sink point of both working and protection domain.

When the TMN configures the network, it should define each protection domain. It can maintain a database preferably at each sink node, in which each network element that located in the protection domain corresponding to the sink node will be described in the form of a protection data entity (PDE). A PDE will consists of Location ID, Domain INFO, Status (Ready or Outage), Node Category (Source/Sink/Intermediate) and other information as required. The location, position (working/protection) and status (ready/outage) of all the nodes involved will be assigned to sink point G.

When an AIS cell arrives at the sink point G, it will be passed to the next downstream node without any change, and its DLF will also be checked whether the value corresponds to one of the identifiers B, C, D, E, F. If so, the protection switch from B-C-D-E-F to H-I-J-K will be triggered.

The structure and operation of a sink node will be discussed in more detail later.

FIG. 2, Nested Protection Switch Scenario

A, B, C, D, E, F, G // A, B, C, L, M, E, F, G comprises working entity 1;

A, H, I, J, K, G comprises protection entity 1;

A is the source point of both working and protection entity 1;

G is the sink point of both working and protection entity 1;

C, D, E comprises working entity 2;

C, L, M, E comprises protection entity 2;

C is the source point of both working and y protection entity 2;

E is the sink point of both working and protection entity 2.

When the TMN configures this protection domain hierarchy, the location, position (working/protection), hierarchy(protection level) and status(ready/outage) of all the nodes involving the outer protection switch will be assigned to sink point G, and the location, position, hierarchy and status of all the nodes involving the inner protection switch will be assigned to sink point E.

When an AIS cell arrives at the sink point E, it will be passed to the next downstream node without any change, and its DLF will also be checked whether the value is one of the identifier D. If so, the protection switch from D to L–M will be triggered.

When an AIS cell arrives at the sink point G, it will be passed to the next downstream node without any change, and its DLF will also be checked to determine whether the value is one of the identifiers B, C, E, F. If so, the protection switch from B- . . . -F to H- . . . -K will be triggered. Since Node G has information relating to the desired protection hierarchy it will not initiate protection switching when the location ID is in the inner domain (D).

As an additional capability, if the location value is L, M, the TMN can check the status of D, then determine whether to trigger outer or inner protection switch.

FIG. 3, Data Traffic Path

FIG. 3 illustrates in schematic form the path of data traffic through the hierarchy of layers in each of the nodes of the network. Starting from the first end 31, it passes through various ATM layers, before being passed via the physical layers to a source node 32. It may have passed through intermediate nodes defining the link with the source node 32. At the source node the path goes into the ATM layers, where the data stream is divided down into individual ATM cells. This means individual connections can be monitored at this point. Also, it means that cells can be inserted. FIG. 3 shows an AIS cell being inserted, as a result of a fault being located.

The data path continues onto the sink node 50 in as similar manner Again, the data path passes through the ATM layers, where individual cells, and therefore individual connections can be accessed The bypass path (not shown in FIG. 3) would pass from the ATM layers of source node 32, to the ATM layers of sink node 50, via the respective physical layers. By providing bypassing at the ATM, or packet level, rather than the physical level, provisioning of the bypass paths becomes easier, as explained above.

Figure 4:
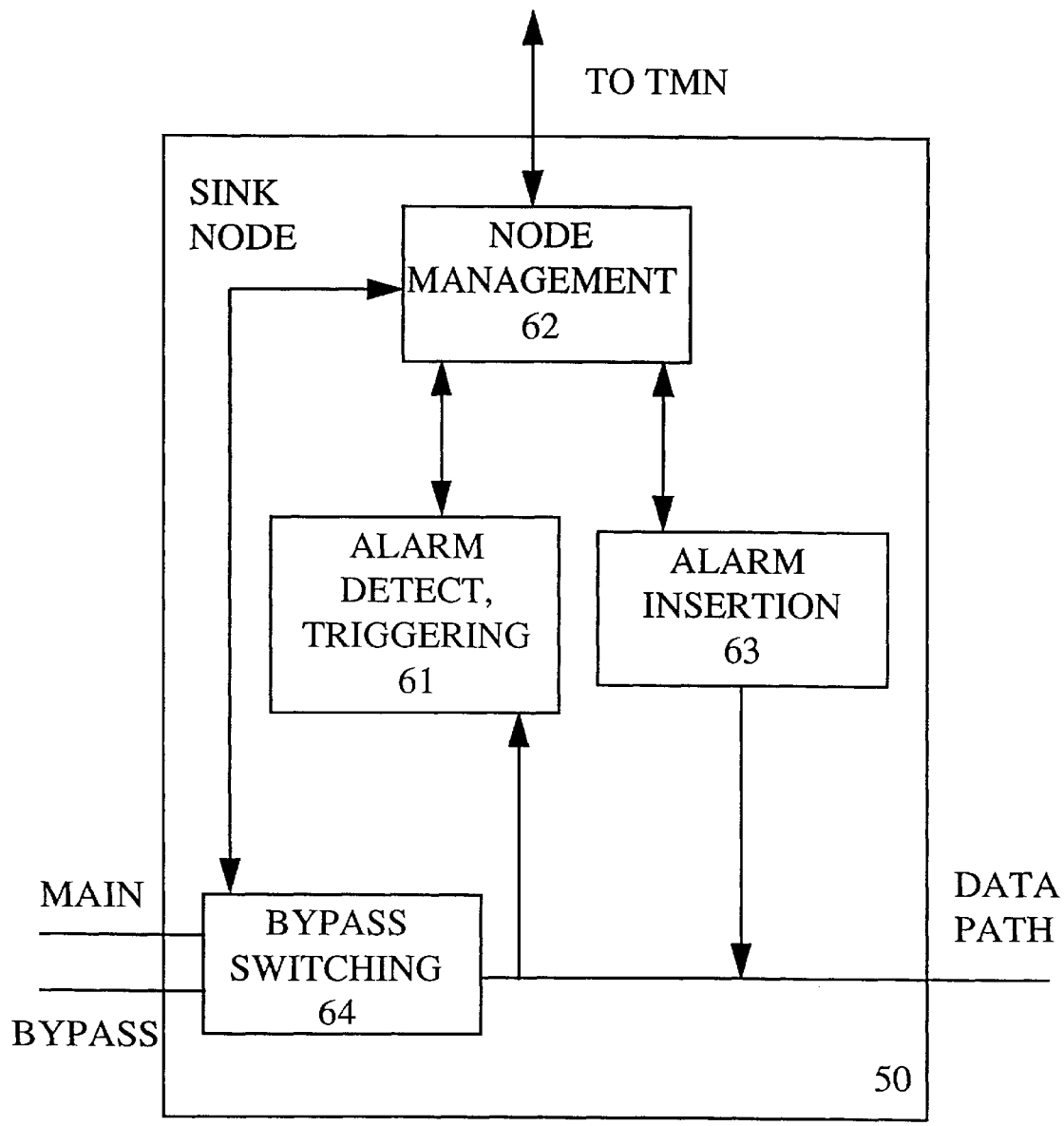
FIG. 4 shows in schematic form an embodiment of a node of the invention.

FIG. 4, Overview of Node Functions

FIG. 4 shows in schematic form the main elements of a sink node. Alarm detect and triggering functions 61 are provided, controlled by node management functions 62. The management functions also control the alarm insertion functions 63, and the bypass switching functions 64, which would switch the data path on a connection basis. It will be evident that the alarm insertion functions are necessary in a source node, and the source node (not illustrated in detail) would contain switching equivalent to the bypass switching 64.

Such switching functions will not be described in detail as it is well known how to implement such functions. Several switching arrangements are conceivable. In one plus one switching, at the source, the data is copied, and all data passes along both branches of the protection domain, to the sink node. Here, one of the two data paths is connected to the rest of the data path, and one of the paths in the domain is terminated without using the data. This has consequences for the control of the switching. If the trigger is generated at the sink node, it will be quicker to have the switching done in the sink node. An alternative is to switch the bypass path at the source node, in which case only one of the paths in the protection domain is being used, which may save on transmission charges. This requires the trigger to be transmitted to the source node. This can be done in a one-phase process, by transmitting along the unused part from the sink to the source. If the source confirms or acknowledges the switching commands, the exchange becomes two-phase.

Each of the functions of the node shown in FIG. 4, will be described in more detail.

Figure 5:
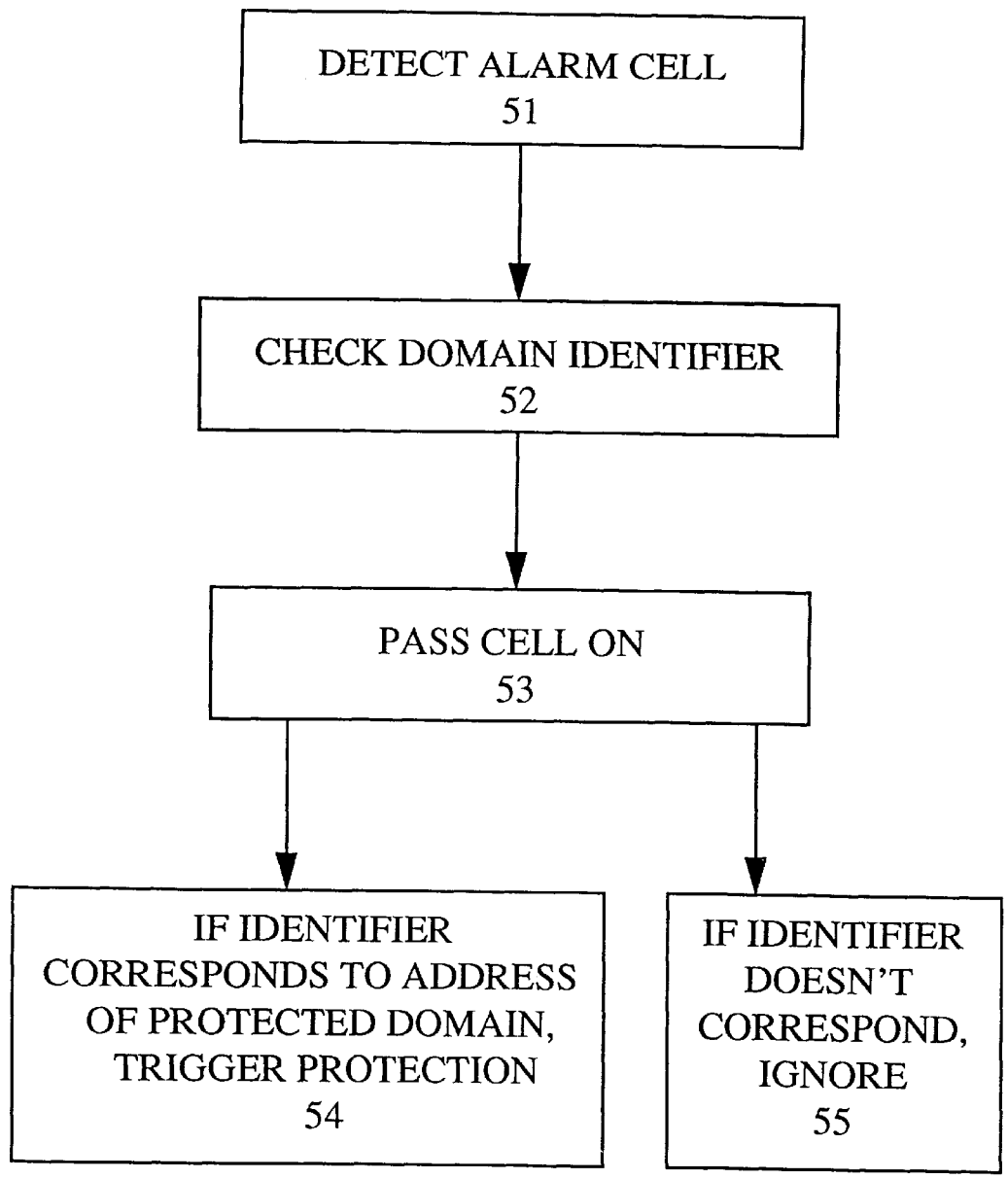
FIG. 5 shows in schematic form the triggering operation of the node of FIG. 4.

FIG. 5, Sink Node Triggering Operation

At 51, detection of a cell indicating an alarm (AIS cell) is carried out. The domain identifier in the alarm cell is checked at 52. The cell is passed on at 53, to avoid delaying the data stream. At 54 and 55, if the identifier corresponds to the address of the protected domain, a trigger is generated. Otherwise, the identifier is ignored.

Figure 6:
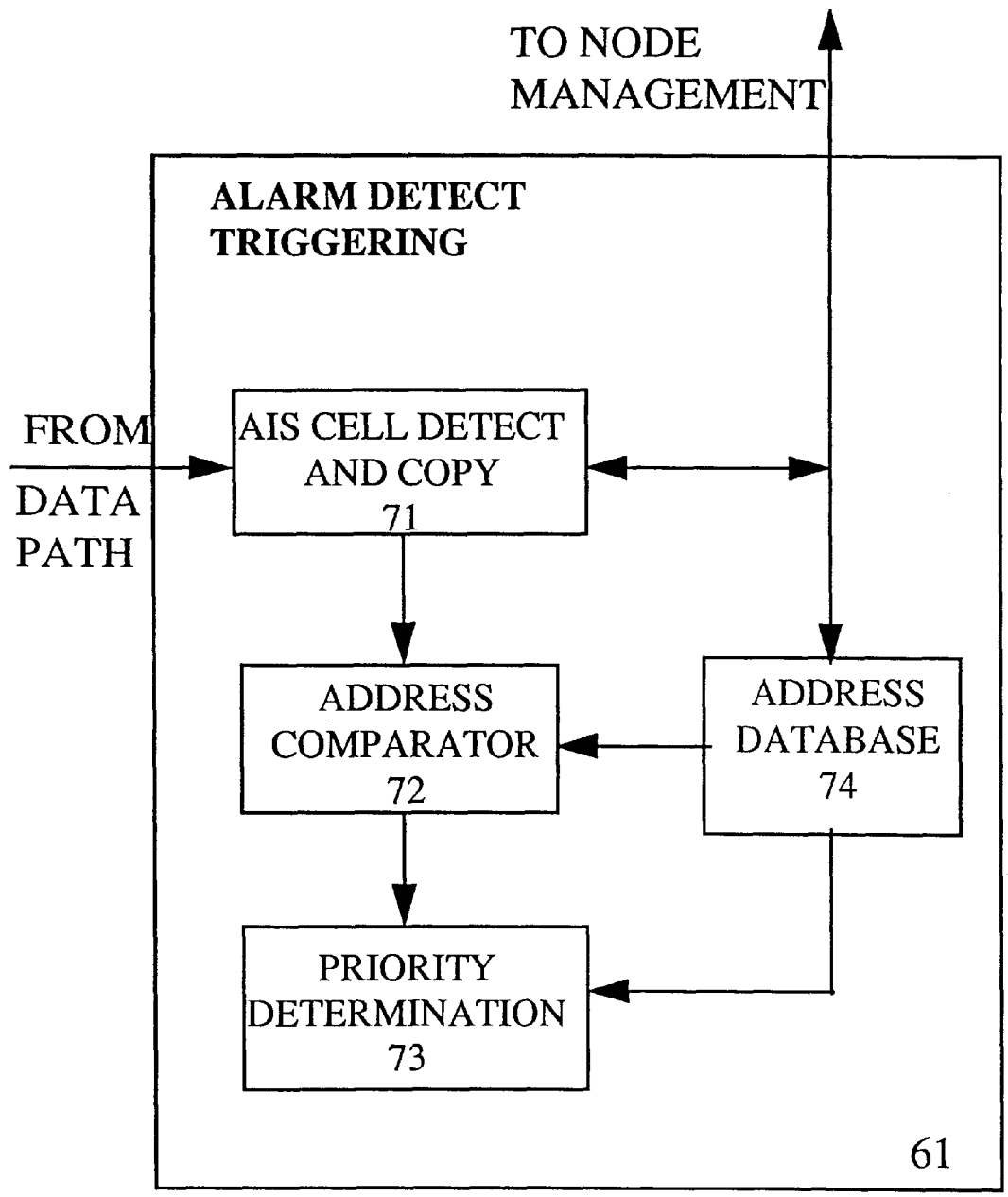
FIG. 6 shows in schematic form the node alarm detect/trigger functions.

FIG. 6, Alarm Detect Triggering Structure

FIG. 6 shows in schematic form bow the functions may be implemented. The cell detect and copy is an example of a detecting means. It takes data, reconstructs cells, and examines what type they are. It may have an input directly from the data path, or from the bypass path switching functions 64 (FIG. 4). Each cell checked to see if it is an OAS cell. If so, the type of OAS cell is examined, to see if it is an AIS cell, at 71. If so, a copy is made of the entire cell, to enable it to be processed further, without delaying the data being transmitted. As these functions need to be carried out as quickly as possible, normally a designated hardware is used, preferably in the form of an Application Specific Integrated Circuit (ASIC). Detailed design would be a matter for a skilled person, and need not be described further here. The trigger should be generated as quickly as possible and a fast comparator 72 may be implemented in hardware if the number of addresses it needs to compare is not too great. It may be possible to speed up this operation by encoding the domain address identifiers contained in the AIS cell, in such a way that a simple algorithm can be performed without a comparison step. At 73, there may be a priority determination to make before triggering, if for example there are multiple nested by-pass paths, and therefore more than one possible protection circuit, Reference may be made to an address database 74 which may be held directly on the ASIC, or may be held in ram, as part of the node management functions.

Figure 7:
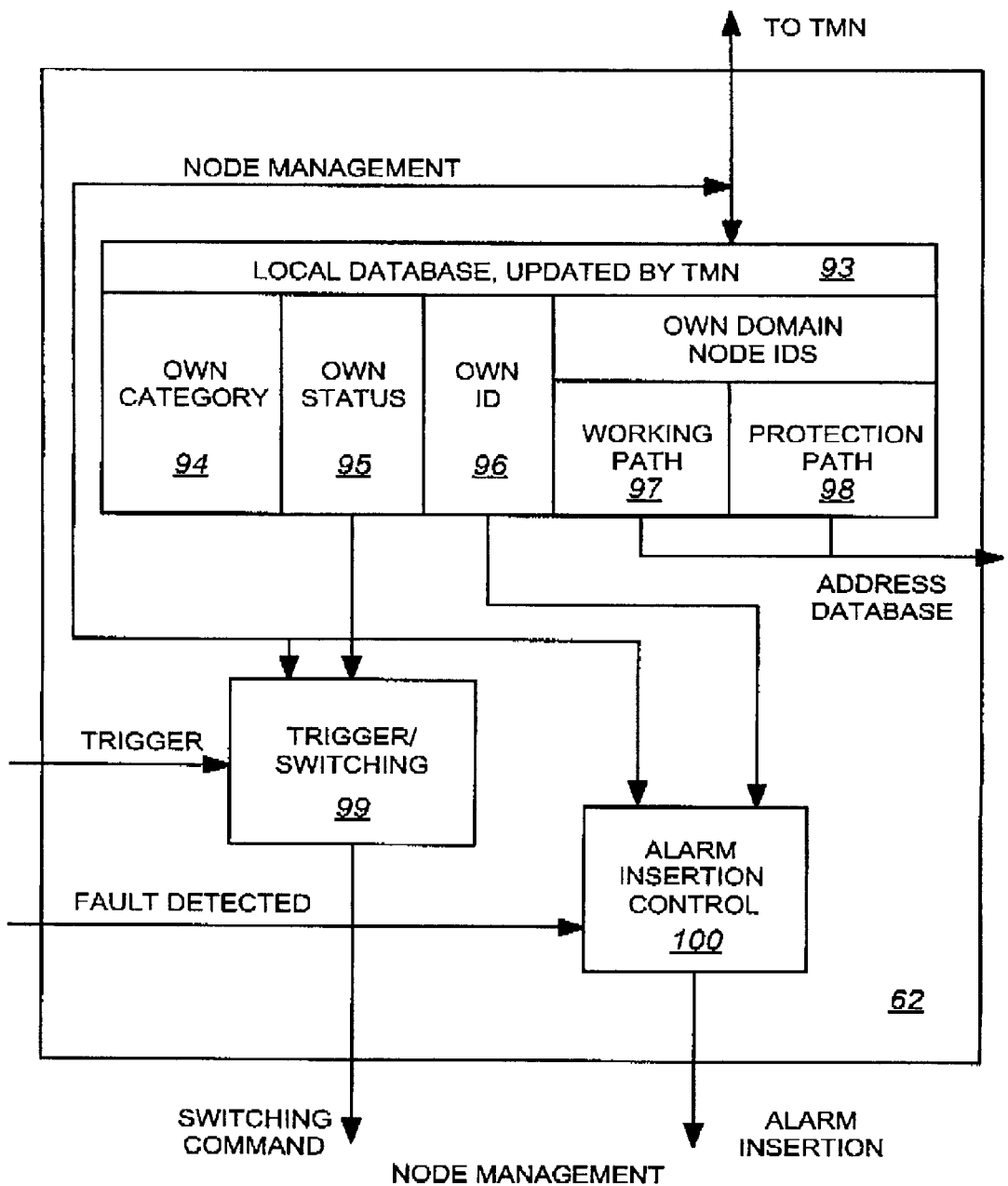
FIG. 7 shows in schematic form the node management functions.

FIG. 7, Node Management Functions

The node management functions shown in FIG. 7 include a local database 93, updated by the TMN and containing at least the information shown. The category of the node 94 indicates whether it is an intermediate node, a source node or a sink node, or more than one of these. The status 95 indicates whether the node is operating under normal path conditions, or under bypass path conditions, and this information may be used in controlling the bypass switching function 64, for example to initiate reversion from a bypass path to a normal path.

The ID of the node is stored at 96, and is used in the alarming session control. At 97 and 98, the identifiers of the nodes in the protection domain controlled by the current node, are divided into those in the normal working path, and those in the protection path. These may change during the operation of the system, even after the initial configuration by the TMN. For example, in a nested arrangement, the working path of an outer domain may include part of an inner domain. If the inner domain is switched, then the working path of the outer domain is changed, and the TMN should update the database of the sink node of the outer domain, accordingly.

It is not necessary that the domain identifiers in the alarm cells be node identifiers. For example, all the nodes in a given path of a given domain, could be assigned a path identifier. In either case, at the sink node, either the domain ID or the path ID can be used to uniquely identify whether the alarm originated in the node's own domain.

The node management functions shown schematically in FIG. 7 could be implemented in the same ASIC as would be used for some of the other functions of the node, if a processor could be implemented in the ASIC. The connection to the To would be implemented using a Q3 interface, and any low bandwidth wide area network, such as ethernet, or X25, since the network management communications are mostly not time critical. Detailed implementation would be a matter of routine for a skilled person, and need not be described in more detail here The trigger/switching functions 99, enable the node management functions to mask the trigger if appropriate, if the TMN wants to inhibit protection switching for any reason. Reversionary or nonreversionar policies could be implemented, and coordination with other parts of the network, can be facilitated by the TMN influencing the switching command output.

At 100, the alarm insertion control is shown, to give the node management function 62 (FIG. 4) some control over alarm insertion, for example to enable alarm filtering and updating of the alarm filtering algorithm by the TMN.

The alarm cell insertion mechanism is well known from ITU recommendations I731 and I732 to which reference is made, and therefore need not be described here in detail. Using the Defect Location field in the AIS cell to identify protection domains is advantageous because:

Defect Location field is defined by I.610 and is intended to be used for explicitly determining the fault location in general for any application (not just protection ID domain), and use of this field is being considered for defect localization purposes, Using location information to determine protection domain will not modify any existing principles and mechanisms defined in I.610, TMN will be used to coordinate and provision all the network configuration information in the case of protection domain.

The invention is not limited to the particular details of the apparatus depicted, and other modifications and applications are contemplated without departing from the scope of the invention claimed.

What is claimed is:

1. A method of triggering a rerouting of data in a packet based telecommunication system, the system comprising a main data path and at least one bypass path, for bypassing a portion of the data path, the portion and the respective bypass defining a protection domain and having a source node in common at an upstream end and a sink node in common at a downstream end, the system comprising nodes for each of the domains, for monitoring respective domains and for issuing alarms in the form of packets, to other nodes downstream, with a domain identifier indicating the respective domain in which the alarm originated, the method comprising the steps of:

detecting at a sink node an alarm issued from a node upstream of the sink node and a corresponding domain identifier;

determining at the sink node whether to trigger a rerouting of the data along one of the bypass paths which bypasses the domain monitored by the sink node, on the basis of the detected domain identifier.

2. The method of claim 1 wherein the detecting at the sink node an alarm issued from a node upstream of the sink node comprises monitoring data being received at the sink node for alarms inserted into the data.

3. The method of claim 2 wherein the system is connection oriented, and the rerouting is carried out without making a new connection.

4. The method of claim 1 wherein the system is connection oriented, and the rerouting is carried out without making a new connection.

5. The method of claim 1 wherein the system comprises nested domains, and the method comprises the steps of determining that in an inner of the nested domains, the main path and the bypass path are faulty, and determining that the bypass for an outer one of the domains that is not already triggered should be triggered.

6. The method of claim 1, wherein the sink node comprises a stored database indicating a priority where a domain can be bypassed by more than one bypass path, and the step of determining whether to trigger is made additionally on the basis of the stored priority.

7. The method of claim 1 wherein the domain identifier comprises a node identifier.

8. The method of claim 1 wherein the sink node comprises a database of identifiers of nodes in the domain of the given node.

9. The method of claim 8 wherein the database is updated by a network management system.

10. A method of bypassing faults in a packet based telecommunication system, the system comprising a main data path and at least one bypass path, for bypassing a portion of the data path, the portion and the respective bypass defining a protection domain and having a source node in common at an upstream end and a sink node in common at a downstream end, the system comprising nodes for each of the domains, for monitoring respective domains and for issuing alarms in the form of packets, to other nodes downstream, with a domain identifier indicating the respective domain in which the alarm originated, the method comprising the steps of:

detecting at a sink node an alarm issued from a node upstream of the sink node and a corresponding domain identifier;

determining at the sink node whether to trigger a rerouting of the data along a bypass path which bypasses the domain monitored by the sink node, on the basis of the detected domain identifier; and rerouting the data along the bypass path according to the trigger.

11. The method of claim 10, further comprising the preliminary step of configuring the bypass paths on a connection basis using a network management system.

12. The method of claim 10 wherein the domain identifier comprises a node identifier.

13. The method of claim 10 wherein the given node comprises a database of identifiers of nodes in the domain of the given node.

14. The method of claim 13 wherein the database is updated by a network management system.

15. Software on a computer readable medium for carrying out a method of triggering a rerouting of data in a packet based telecommunication system, the system comprising a main data path and at least one bypass path for bypassing a portion of the data path, the portion and the respective bypass defining a protection domain and having a source node in common at an upstream end and a sink node in common at a downstream end, the system comprising nodes for each of the domains, for monitoring respective domains and for issuing alarms in the form of packets, to other nodes downstream, with a domain identifier indicating the respective domain in which the alarm originated, the method comprising the steps of:

detecting at a sink node an alarm issued from a node upstream of the sink node and a corresponding domain identifier;

determining at the sink node whether to trigger a rerouting of the data along one of the bypass paths which bypasses the domain monitored by the sink node, on the basis of the detected domain identifier.

16. The method of claim 15 wherein the given node comprises a database of identifiers of nodes in the domain of the given node.

17. The method of claim 16 wherein the database is updated by a network management system.

18. A sink node for a packet based telecommunication system, the system comprising a main data path and at least one bypass path for bypassing a portion of the data path; the portion and the respective bypass defining a protection domain and having a source node in common at an upstream end and a sink node in common at a downstream end, the system comprising nodes for each of the domains, for monitoring respective domains and for issuing alarms in the form of packets, to other nodes downstream, with a domain identifier indicating the respective domain in which the alarm originated, the sink node comprising:

means for detecting an alarm issued from a node upstream of the sink node and a corresponding domain identifier;

means for determining whether to trigger a rerouting of the data along one of the bypass paths which bypasses the domain monitored by the sink node, on the basis of the detected domain identifier.

19. A packet based telecommunication system, the system comprising a main data path and at least one bypass path, for bypassing a portion of the data path, the portion and the respective bypass defining a protection domain and having a source node in common at an upstream end and a sink node in common at a downstream end, the system comprising nodes for each of the domains, for monitoring respective domains and for issuing alarms in the form of packets, to other nodes downstream, with a domain identifier indicating the respective domain in which the alarm originated, the system comprising:

means for detecting at a sink node an alarm issued from a node upstream of the sink node and a corresponding identifier;

means for determining at the sink node whether to trigger a rerouting of the data along one of the bypass paths which bypasses the domain monitored by the sink node, on the basis of the detected domain identifier.

* * * * *